United States Patent [19]

Longerbeam

[11] 4,217,040
[45] Aug. 12, 1980

[54] APPARATUS FOR PROJECTING AN IMAGE HAVING A CONVOLUTED FOCAL PLANE

[76] Inventor: Donald A. Longerbeam, 1553 Lago Apt. 1, San Mateo, Calif. 94403

[21] Appl. No.: 892,698

[22] Filed: Apr. 3, 1978

[51] Int. Cl.³ .............................................. G03B 21/00
[52] U.S. Cl. ..................................................... 353/46
[58] Field of Search ................. 350/4.1, 4.2, 285, 179, 350/180, 188, 193, 201, 204, 360; 353/1, 2, 120, 122, 46; 272/10, 8 P; 362/318, 811; 40/444, 581, 433

[56] References Cited

U.S. PATENT DOCUMENTS

| | | | |
|---|---|---|---|
| 2,725,230 | 11/1955 | Weintraub | 353/84 X |
| 3,030,856 | 4/1962 | Jordan | 353/1 |
| 3,140,347 | 7/1964 | Cohen | 274/8 P |
| 3,366,786 | 1/1968 | Delano | 350/4.1 X |
| 3,600,076 | 8/1971 | Synder | 353/1 X |
| 3,679,888 | 7/1972 | Reback | 362/811 X |
| 3,755,664 | 8/1973 | Reiback | 362/811 X |
| 3,757,106 | 9/1973 | Bau et al. | 362/811 X |
| 3,767,299 | 10/1973 | Fisher | 353/1 X |

FOREIGN PATENT DOCUMENTS

| | | | |
|---|---|---|---|
| 1257721 | 2/1961 | France | 353/1 |
| 222006 | 9/1924 | United Kingdom | 362/811 |

OTHER PUBLICATIONS

"Projects in Sight, Sound and Sensation" by Mitchell Waite pp. 75-81.
"The Art of Light and Color" by Dr. Tom D. Jones pp. 87-93.

*Primary Examiner*—Harry N. Haroian
*Attorney, Agent, or Firm*—Paul Hentzel

[57] ABSTRACT

A light source focuses light on a revolving, apertured color disc. The portion of the light passing through the moving colored apertures is refracted by a projection lens into a small beam. The beam passes through the peripheral area of two large convex lenses sequentially positioned in the projection path. The optical properties of the two lenses combine to define distant focal surface. Each of the convex lenses has smooth optical irregularities randomly formed on each surface thereof for generating convolutions in the distant focal surface. The two lenses rotate slowly in opposite directions causing a smooth animation of the convolutions on the focal surface. The lens rotation continuously introduces new combinations of optical irregularities into the projection path each of which establishes unique and slowly changing convolution arrangements on the focal surface. The image is viewed on a reflective surface positioned proximate the distant focal surface. A multi-colored light source may be employed in place of the colored disc. The colors may be modulated in response to a music input signal to provide a music coordinated color display.

42 Claims, 6 Drawing Figures

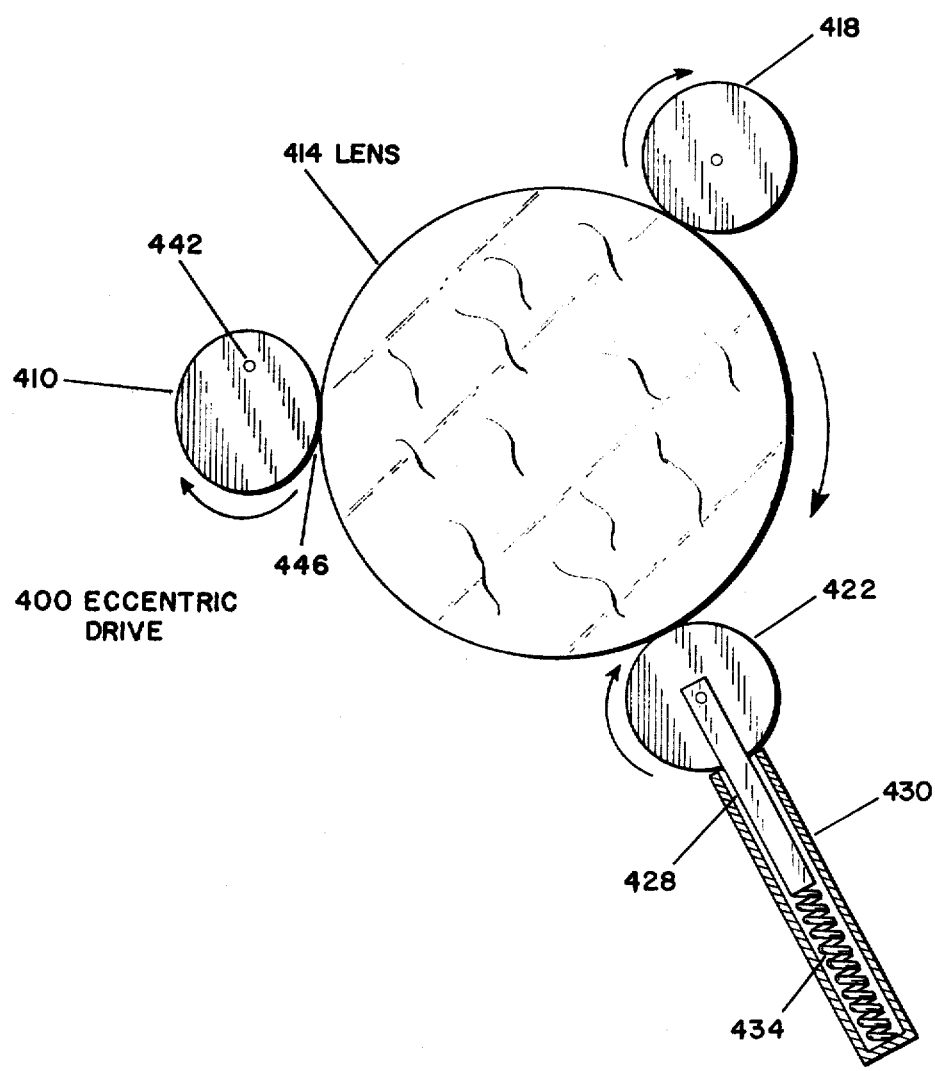

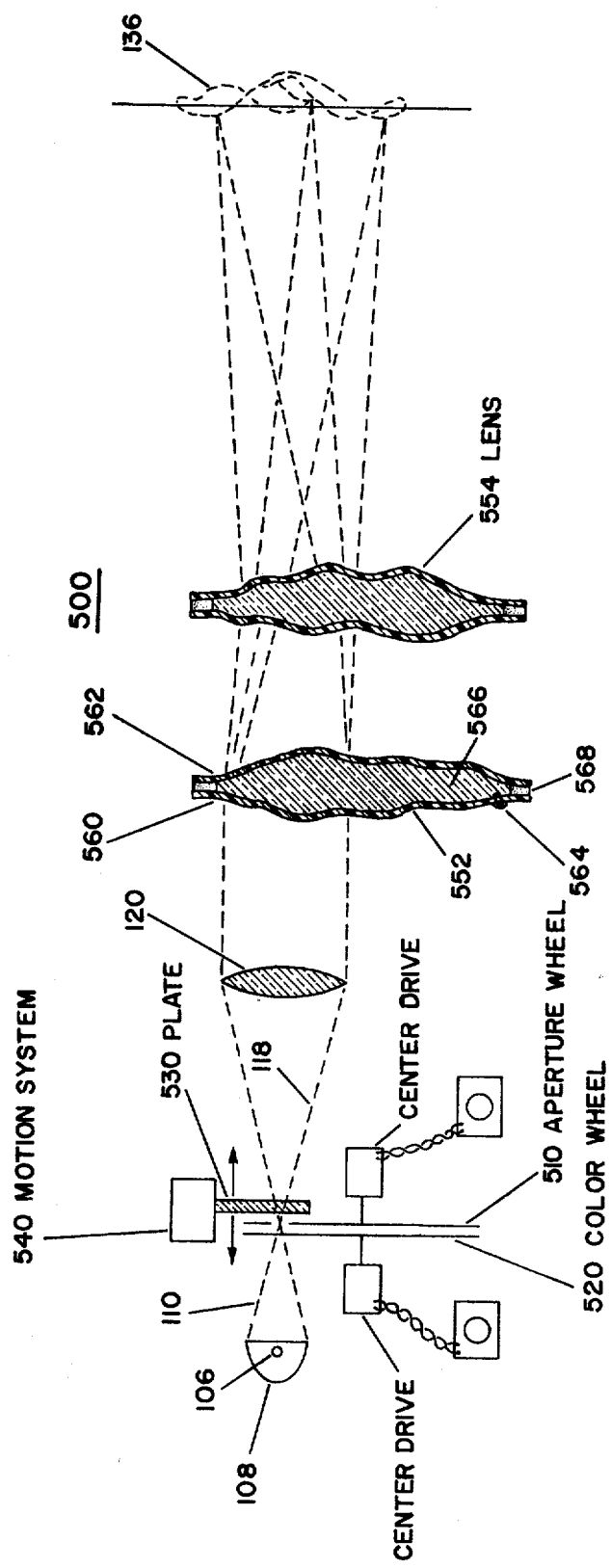

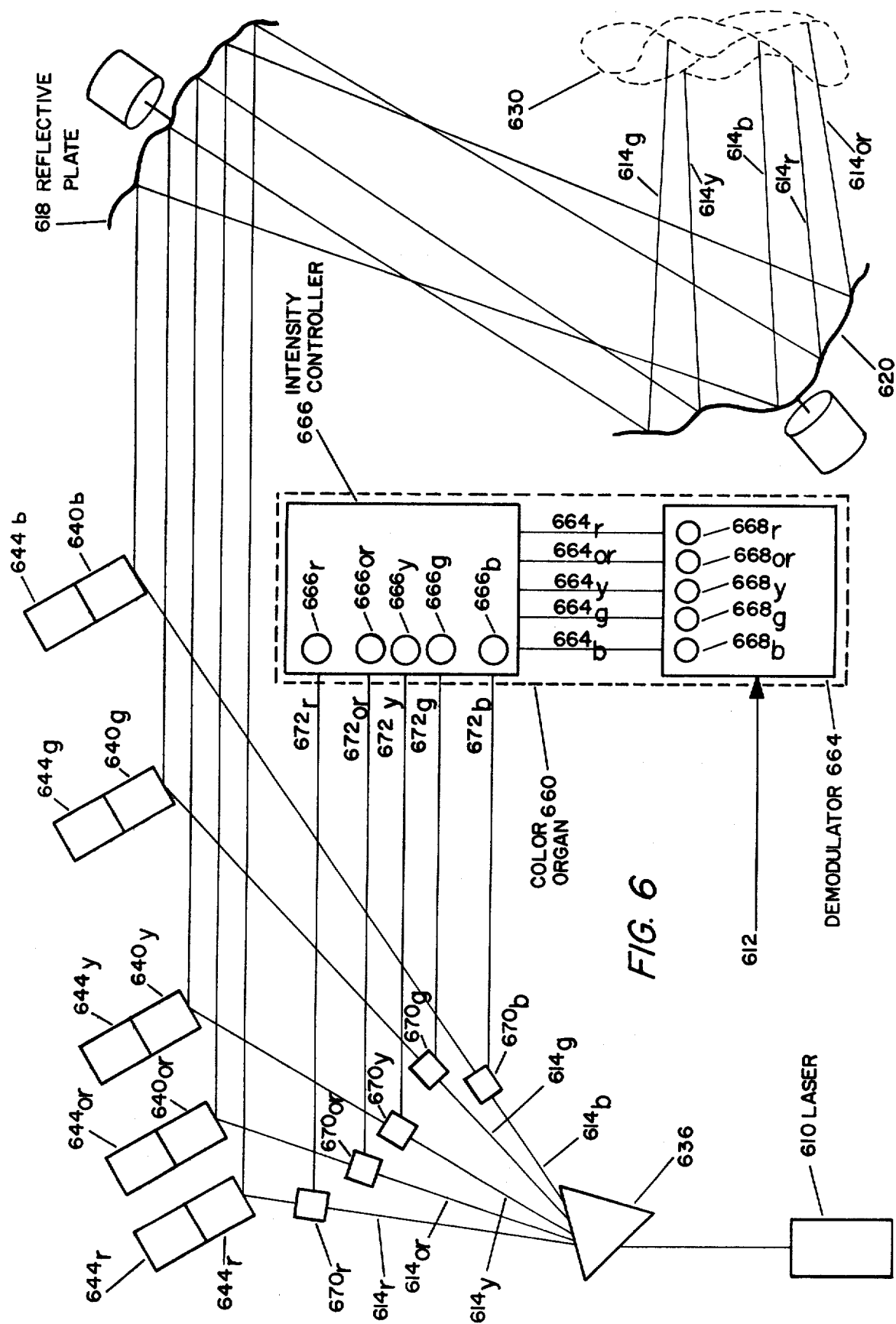

APPARATUS FOR PROJECTING AN IMAGE HAVING A CONVOLUTED FOCAL PLANE

FIELD OF INVENTION

This invention relates to decorative image projections, and more particularly to image projections which project a decorative image having a focal surface with changing convolutions thereon.

DISCUSSION OF THE PRIOR ART

Heretofore, decorative light images have been formed by passing light through a revolving color wheel and dispersing the resulting colored light by means of a revolving reflector such as crinkled aluminum foil. This prior art technique produced decorative lighting effects consisting primarily of an exciting array of flashes and streaks of colored light, as disclosed in the following U.S. Pat. Nos. 3,242,330 to Schoffer, Mar. 22, 1966; 3,366,786 to Delano, Jan. 30, 1968; 3,538,323 to Zeigler, Nov. 3, 1970; and 3,679,888 to Reiback, July 25, 1972.

The optical discontinuities created by the edges which define the facets in the crinkled reflective surface created hundreds of separate and unrelated splashes of light. No consideration was given to providing a coordinated whole image on an integrated focal surface.

U.S. Pat. No. 3,755,664 to Reiback, Aug. 28, 1973 teaches an arbitrarily shaped, stationary refractive member for establishing a fixed convoluted focal surface, and a color wheel for providing a changing image. Reiback's convoluted focal surface is not animated to provide unpredictable convolution arrangements. The color wheel of Reiback is not apertured to provide discrete images moving across the projection path.

SUMMARY OF THE INVENTION

It is therefore an object of this invention to provide an improved soft image having a complex intensity-color pattern which slowly changes in a flowing relaxing manner.

It is therefore another object of this invention to provide a charismatic projected image suitable for contemplation and meditation.

It is still another object of this invention to provide a modulated projected image having a moving convoluted focal surface.

It is yet another object of this invention to provide a semifocused projected image without definite boundaries.

It is further an object of this invention to provide a continuously changing projected image having a focal surface with animated convolutions.

It is another object of this invention to provide an image projection apparatus having an apertured objective structure for forming a series of discrete images.

It is still another object of this invention to provide an image projection system which does not require a flat or even uniform projection screen.

It is yet another object of this invention to provide an image projection system which may be employed in either the front or back projection mode.

It is a further object of this invention to provide a multicolor imaging system responsive to music.

It is another object of this invention to provide an image which can be photographed to form slides, movies, prints etc.

It is still another object of this invention to provide an imaging system employing a laser light source.

Briefly, these and other objects are accomplished by forming an image from an object source at a focal surface determined by a projection system. The focal length of the projection system is varied throughout the cross section of the projected image by optical modulation elements which cause convolutions along the focal surface. A drive device rotates the modulation elements to rotate the convolutions on the focal surface. A light control member within the object source has a light transmission pattern which forms the projected image. Another drive device moves the light control pattern causing a corresponding motion of the projected image. The light control member may be a rotating aperture wheel with or without color filters associated with the apertures. Alternatively, the rotating color wheel may be employed proximate the aperture wheel to provide periodic changes in background color while the aperture wheel supplies a series of apertures images to be projected. The object source may include a light source providing a converging beam which focuses proximate the aperture being imaged to maximize the brightness of the image. The first lens in the projection system may be repositioned to locate the focal point thereof proximate the light control member in order to vary the focus of the image. The modulation elements may be optical irregularities formed on the surface of either lens or mirror elements included in the projection system. The elements may be moved or rotated at different velocities or angular velocities to cause complex instantaneous changes in the convolutions. The result of the multiple sets of moving convolutions are multiple convoluted focal surfaces which move and combine to form a single animated focal surface.

BRIEF DESCRIPTION OF THE DRAWINGS

Other objects and advantages of the present invention and the operation of the projecting apparatus will become apparent to those skilled in the light projection art, from the following detailed descriptions in conjunction with the accompanying drawings in which:

FIG. 4 is a plan view of an eccentric lens drive for simultaneously effecting rotational and translational motion of an annular lens;

FIG. 5 is a schematic view of another embodiment of an image projection system showing plexiglass-oil lenses in section; and FIG. 6 is a schematic view of a multicolor laser embodiment of the image projection system employing aberrated mirrors.

COUNTER ROTATING LENSES EMBODIMENT

Figure 1:
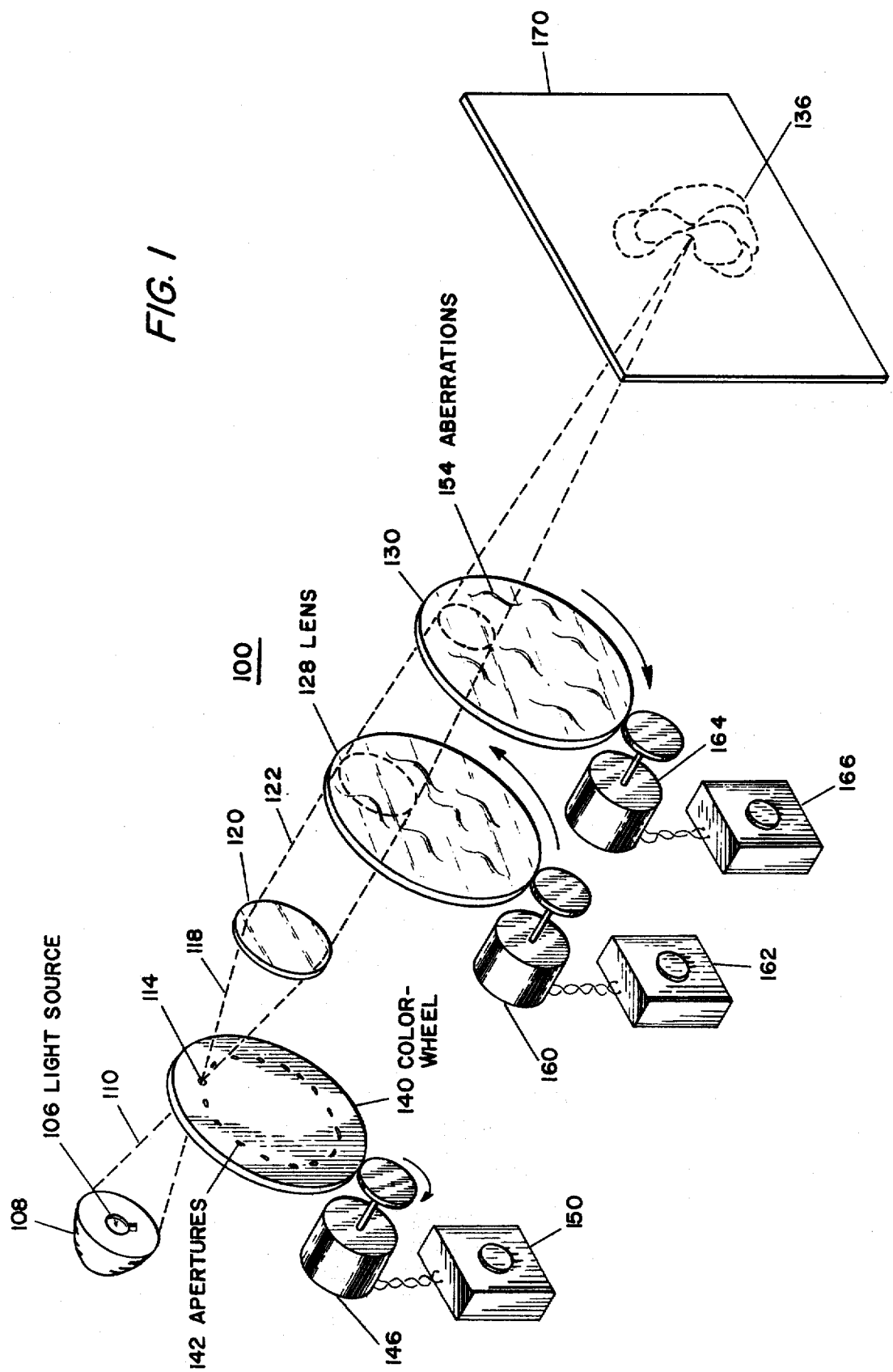
FIG. 1 is an isometric schematic view of a counter rotating lens embodiment of the image projection system.

FIG. 1 shows image projecting apparatus 100. A light source 106 with a condensing reflector 108 focuses converging light beam 110 at focal point 114. The post focus diverging beam 118 passes through a projecting lens 120 forming projection beam 122. Beam 122 passes through a peripheral region on each of two sequentially positioned irregular lenses 128 and 130. The two irregular lenses define a distant convoluted focal surface 136 which is an imaginary convoluted surface in space proximate to but not coexistant with the reflective planar viewing surface 170. The object of projection system 100 is formed by an apertured rotating color disc 140 positioned within the light beam proximate light source focal point 114. Colorwheel 140 has a sequence of peripheral colored apertures 142 which pass through the light beam as color disc 140 rotates causing variations in the intensity and color of the projected image. The speed of object drive motor 146 may be varied by control device 150 for establishing the desired rate of change of the projected image. The surface of projecting lenses 128 and 130 contain smooth optical irregularities or undulations 154 which cause convolutions on focal surface 136. Irregularities 154 within light beam 122 differentially alter the focal length of projection beam 122 throughout the cross section thereof. The aberrations formed by irregularities 154 collectively form convoluted focal surface 136. Lens drive motor 160 rotates irregular lens 128 continuously changing the aberration content of light beam 122 causing the convolutions of focal surface 136 to move across the image area and be continuously replaced by other convolutions. The rate of convolution motion may be adjusted by speed control device 162. Another lens drive 164 rotates the other irregular lens 130 in the opposite direction as irregular lens 128. Irregularities 154 on lens 130 provide a counter moving component of convolutions which compounds the replacement of the convolutions on focal surface 136. The resulting composite focal surface 136 is animated by smoothly varying convolutions. The speed of the counter moving convolution component may be adjusted by speed control device 166. The projected image appearing on viewing surface 170 positioned proximate focal surface 136 is distorted by irregularities 154. More than two aberrated lenses may be employed to increase the animation and amplitude of the convolutions. A single aberrated lens provides a fixed convoluted focal surface which tracks the motion of the single lens, but which is unanimated. The lenses may be double convex having aberrations on one or both optical surfaces; or the lenses may be planar convex with aberrations on either surface.

The image may be front projected on a reflective viewing screen or wall. An uneven or faceted viewing surface may be employed because a true reproduction of the image is not required. An added motion-dimensional effect may be provided by employing a moving reflective viewing surface such as a veil or curtain. A viewing volume of reflective vapors contributes to the three dimensional aspect of the image. Alternatively, the image may be back projected through a diffusion screen. The image produced by any of the above viewing techniques is a real image which can be photographed and processed as desired.

LIGHT SOURCE

Light source 108 is preferably a wide waveband emissive point source such as a tungsten incandescent lamp, in order to supply the various colors passed by colored apertures 142 on color wheel 140. Reflector 108 is preferably a parabolic or ellipsoidal device for concentrating the light from the incandescent filament at focal point 114. As each aperture 142 passes through focal point 114, most of the light provided by light source 108 passes through the filter in the aperture causing the brightest image possible of each color. The distance of color wheel 140 may be varied in either direction from focal point 114 as desired to control the spot size of beam 122 and the degree of residual focus of the projected image.

PROJECTION LENS

Projection lens 120 is positioned in the projection path to receive the diverging beam 118 passed by the apertures 142. The focal point of the projection lens 120 is proximate the apertures 142. Position of the projection lens 120 is adjustable so that its focal point may be moved closer to or farther from the glowing apertures 142. Projection lens 120 refracts diverging beam 118 to form the more or less collimated beam 122 which may or may not converge to form a real image of the apertures 142 in the distant focal surface 136. Image formation in the focal surface 136 is dependent on the relative position of the focal point of projection lens 120 relative to apertures 142. Projection lens 120 shown in FIG. 1 is a single lens, however any of the commonly known lens combinations used for projecting an image could be used in its place. Placement of such a projection lens will depend on its characteristics as denoted by its F number, focal point distance, etc.

COLOR WHEEL (Light Control Means)

Figure 2:
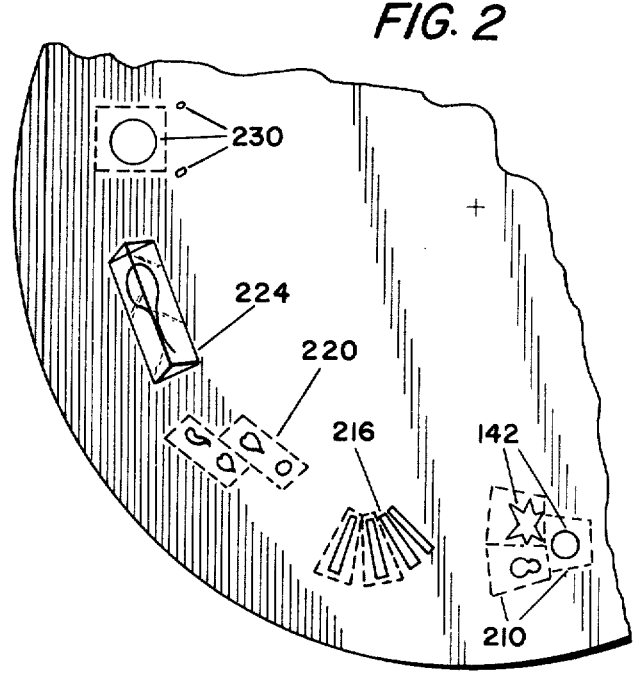
FIG. 2 is a plan fragmentary view of an apertured color disc which forms the object of the image projection system of FIG. 1.

The object structure of image projection apparatus 100 may be any suitable device for variably blocking converging light beam 110 to produce a changing image. In the embodiment of FIG. 1, color disc 140 has a series of apertures 142 as shown in FIG. 2, each provided with a filter 210 of a desired color. The apertures may be annular or irregular in shape as desired. Narrow slits 216 provide a ray of light image of increasing intensity and scope. The apertures may form a cluster 220 to provide a period of multicolored images, or be spaced to provide single color displays separated by brief dark periods. Tiny prisms 224 may be introduced to create rainbow effects. Pinpoints 230 may be placed adjacent to filtered apertures for supplementing the colored light with a halo border of white light. The wheel itself may be slightly transparent to selected colors for providing a background hue of the desired shade. Any refractive or reflective device having variable light absorption capability sufficient to induce adequate modulations in the intensity (and or color) of light beam 110, may be employed.

ABERRATIONS 154

Figure 3:
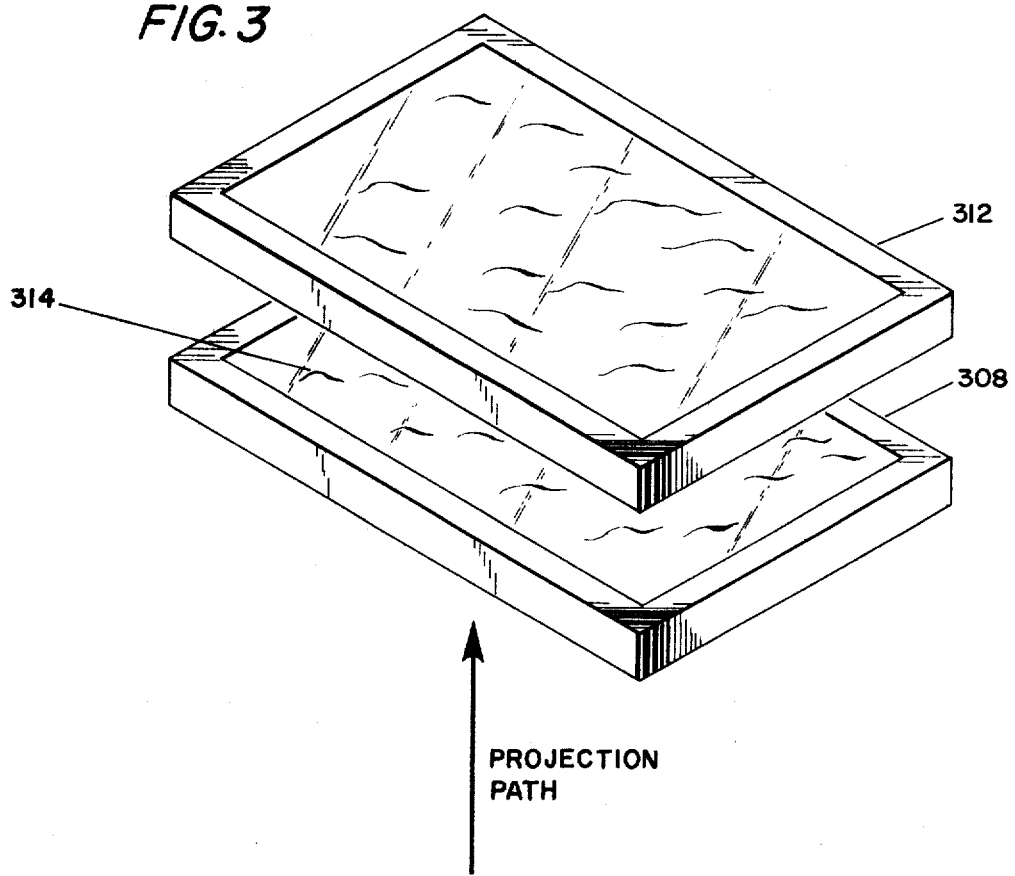
FIG. 3 is an isometric view of a pair of optical plates having arbitrarily undulated surfaces for defining a convoluted focal surface.

The convolutions in focal surface 136 may be formed by any type of refractive or reflective optical irregularity. In the embodiment of FIG. 1, aberrations 154 were formed by irregularities on the surface of the rotating lenses. These aberrations could be formed by air pockets or bubbles within the lenses or by a structure separate from the lenses. A pair of light refractive plates 308 and 312 shown in FIG. 3, having random optical irregularities 314, may be positioned in the projection path to establish the required convolutions in the focal surface. Relative motion between plates 308 and 312 provides the desired convolution animation. Alternatively, the convolutions may be formed by refractive items placed in a bath of liquid of unlike refractive index such as mineral oil. The convolution effect of this embodiment may be enhanced by maintaining an oil level slightly less than the height of the refractive item. The focal surface convolutions are jointly established by the dissimilarity of the refractive index between the oil and the refractive item, and the extending profile of the refractive item above the liquid level. Discontinuities in the convoluted focal surface may be reduced as desired by matching the refractive index of the liquid with the refractive index of the refractive item. In the matched case, the convolutions are due solely to the portion of the refractive item extending above the liquid level. Discontinuities may be further reduced by employing smooth refractive items such as marbles. The meniscus which forms around the oil-marble-air interface, promotes the optical continuity and additionally reduces discontinuities in the focal surface. A single continuous surface without discontinuities may be defined by a mathematical expression, and provides a smoother more flowing display than a focal surface with discontinuities.

DRIVE DEVICE

The drive mechanism for projection lenses 128 and 130 may be any suitable motion device which provides relative motion between the two sources of optical irregularities 154. The continuous change in the combination of optical irregularities 154 which temporarily occupy the projection path create the desired convolution animation of focal surface 136. The embodiment of FIG. 1 employed slow counter rotation to systematically interject optical irregularities 154. The required optical effect may be provided by rotating lenses 128 and 130 in the same direction at different angular velocities. The rate of interjection determines the speed of convolution animation and is a function of the difference in angular velocities. If the angular velocity of one lens is an exact multiple of the angular velocity of the other lens, then the convolution animations become a fixed sequence which is repeated periodically. Random convolution animation may be obtained by avoiding multiple angular velocities.

Random convolution animation may be produced by eccentric drive 400 shown in FIG. 4. Eccentric friction drive 410 causes irregular lens 414 to rotate against idler wheel 418 and spring loaded wheel 422. The eccentricity of drive 410 imparts a periodic translation motion to lens 414 in addition to the rotation motion. Spring loaded wheel 422 has slide 428 which moves along track 430 to accommodate the periodic translation motion of lens 414. The radial displacement of wheel 422 and slide 428 is opposed by spring 434 which continuously urges wheel 422 into contact with rotating lens 414.

In addition to accomodating translation motion produced by eccentric device 410, spring loaded wheel 422 absorbs all other translation motion caused by the remaining rotating members-idler wheel 418, lens 414 and spring loaded wheel 422. These rotating members need not be accurately centered or rounded to function in drive 400. Lens 414 may be out of round due to stresses of manufacture or attrition from wear, without adversely affecting the operation of drive 400.

The eccentricity of friction drive 410 imparts a nonuniform angular velocity to lens 414. The tangential velocity of each point around the circumference of friction drive 410 varies directly at its distance from axis 442 of drive 410. These variations in the velocity of the tangent point of contact 446 between friction drive 410 and lens 414 cause corresponding variations in the angular velocity of lens 414.

FIG. 5 shows image projection apparatus 500 with a separate aperture wheel 510 mounted proximate a separate color wheel 520 having a plurality of different colored sections. The wheels are in relative motion causing each aperture to pass a different color as the aperture is periodically imaged on focal surface 136. The wheels may be in counter rotation in order to provide faster color changes. Aperture wheel is preferably positioned proximate the focal point of light source 106 to maximize the intensity of the projected image.

If desired, stippled plate 550 may be mounted proximate aperture wheel 510. Stippled plate 530 is covered with small closely spaced surface bumps or dimples on either or both sides thereof. Each of the plurality of bumps within the diverging beam 118 causes a separate mini image or light blur on focal surface 136. These mini images move in formation across the larger image as stippled plate 530 is displaced by motion system 540. The motion of stippled plate 540 may be translation, rotation or a combination thereof.

COMPOSITE LENSES

Composite abberator lenses 552 and 554 within projecting apparatus 500 are formed by an irregular envelope structure such as opposed convex plexiglass sheets 560 and 562 with an internal refractive medium such as mineral oil 566 contained therein. Envelope sheets 560 and 562 are peripherally secured by adhesive 568. Oil port 560 is provided in at least one of the envelope sheets 560 or 562.

The plexiglass embodiment of the composite lens may be manufactured by mounting each plexiglass sheet in a circumferential jig, heating the plexiglass to a suitable softening temperature, forcing the plexiglass into the desired irregular convex profile, and cooling the plexiglass to a temperature below the softening range. The port is provided, and the convex plexiglass are peripherally cemented together with a suitable adhesive such as silicone sealant or epoxy resin glue. The envelope thus formed is filled with the refractive fluid, colored or clear, and the port is closed by a suitable plug device such as a nylon screw.

COLLIMATED LIGHT EMBODIMENT

FIG. 6 shows a source of collimated light, such as laser 610, for passing a beam of collimated light 614 through an optical modulator device formed by rotating reflective plates 618 and 620. Reflective plates 618 and 620 have aberrated or uneven optical surfaces which have the combined effect of producing random changes in the shape and position of light beam 614r on viewing surface 630. Preferably, laser 610 is multiline device such as argon, krypton or metal vapor for providing a plurality of different colored light beams. Cadmium vapor lasers provide five emission beams—614r (red), 614or (orange), 614y (yellow), 614g (green), and 614b (blue)—creating a multicolored display on viewing surface 630. Alternatively, a plurality of separate lasers of different colors may be employed. A color separator such as prism 636 separates beam 614 into colored beams 614r-b. Independent deflection devices 640r, 640or, 640y, 640g, and 640b establish independent motion patterns for each beam 614 on viewing surface 630. Deflection devices 640 may be either reflective or refractive to deflect the associated light beam a small amount. Deflection drives 644r-b are provided to continuously displace the associated deflection device causing each beam to move independently of the other beams. If desired, deflections drives 644 may rotate the associated deflection devices 640 causing a tiny periodic deflection pattern for each beam 614r-b, which is sufficient to cause each beam 614r-b to move across the image area of viewing surface 630.

COLOR COORDINATION EMBODIMENT

An electric signal responsive color attenuator such as color organ 660 may be employed to coordinate the color intensity pattern on viewing surface 630 with one or more properties of input electric signal 662. Demodulator 664 converts the modulated signal parameter (ie. frequency, phase, amplitude, dc level, etc.) to provide a plurality of amplitude modulated signals 664r-b within the proper amplitude swing to intensity controller 666. Each amplitude modulated signal 664r-b corresponds to the activity in input signal 662 across a particular band width as determined by band controls 668r-b. A set of color attenuators such as variable density filters 670r-b, are each mounted to intercept at least one of colored beams 614r-b. Each variable density filter 670 is responsive to a single one (or a combination) of controlled output 672r-b of intensity controller 666. The instantaneous content of input signal 662 selectively activates filters 670r-b creating a corresponding instantaneous color intensity pattern on viewing surface 630.

CONCLUSION

The objects of this invention have been accomplished by providing a multistage projection system having aberrated optical elements which produce convolutions in the focal surface of the system. The optical elements are in slow smooth relative motion causing animations in the focal surface. The resulting image is never completely in focus; but is instead a soft semifocused relaxing image without definite boundaries possessing a certain charisma or hynotic effect suitable for contemplation or meditation. The object of the projection system may be illuminated colored apertures of a series of colored light sources.

It will be apparent to those skilled in the art that changes and modifications may be made in the embodiments shown without departing from the scope of the invention. For example, aberrated lenses or mirrors or both may be employed in either the color wheel embodiment (FIG. 1) or the colored light source embodiment (FIG. 6). Multiline lasers are shown in the color light source embodiment; however, other colored light sources may be employed (ie. lamps with colored filters). Therefore, the scope of the invention is to be determined by the terminology of the following claims and their legal equivalents.

I claim as my invention:

1. An apparatus for projecting a selectively distorted real image of an object along a projection path towards a focal surface, comprising;
    a light source;
    light control means forming a light pattern from the light from the light source to define the object of the real image;
    projection means for defining the focal surface and for projecting the real image of the object along the projection path;
    focal surface modulation means positioned in the projection path and having smooth irregularities for distorting the projected real image by causing convolutions on the focal surface; and
    drive means for moving the light control means to cause the real image to move, and for moving the focal surface modulation means to cause the convolutions on the focal surface to move relative to the real image.

2. The apparatus of claim 1, wherein the light control means has a light transmission pattern for defining the object to be imaged.

3. The apparatus of claim 1, wherein the light control means is opaque with a plurality of discrete light ports therein.

4. The apparatus of claim 3, wherein the discrete light ports have filters for selectively passing particular colors of light.

5. The apparatus of claim 1, wherein the light control means is opaque with a plurality of apertures therein.

6. The apparatus of claim 5, wherein at least a portion of the plurality of apertures have filters for selectively passing particular colors of light.

7. The apparatus of claim 1, wherein the motion of the drive means may be adjusted to control the motion of the projected real image.

8. The apparatus of claim 7, wherein the drive means rotates the light control means causing the projected real image to move.

9. The apparatus of claim 8, wherein the light control means is formed by an aperture member and a filter member which are separately rotated by the drive means to provide simultaneous variations in the content and color of the real image.

10. The apparatus of claim 1, wherein the light source provides a converging light beam.

11. The apparatus of claim 10, wherein the converging light beam focuses at a point proximate the light control means.

12. The apparatus of claim 11, wherein the geometric relationship between the light beam focal point and the light control means may be adjusted.

13. The apparatus of claim 11, wherein the light beam focal point may be moved relative to the light control means.

14. The apparatus of claim 11, wherein the light source comprises:
    a wide emission spectrum incandescent lamp; and
    an ellipsoidal reflector for defining the focal point of the converging light beam.

15. The apparatus of claim 11, wherein the projection means comprises a projecting lens positioned on the other side of the light source focal point from the light source within the diverging portion of the light beam for changing the angular dispersion thereof.

16. The apparatus of claim 15, wherein the focal surface modulation means comprises smooth irregularities on at least one surface of the projecting lens.

17. The apparatus of claim 15, wherein the projecting lens is convex having a focal point proximate the light control means for forming an image of the object at the focal surface of the projecting means.

18. The apparatus of claim 17, wherein the projection means further comprises an additional convex lens positioned in the projection path in spaced realtionship with the convex projecting lens.

19. The apparatus of claim 18, wherein the focal surface modulation means comprises smooth irregularities on at least one surface of the convex projection lens and the additional convex lens.

20. The apparatus of claim 17, wherein the geometric relationship between the light control means and the focal point of the convex projecting lens may be adjusted.

21. The apparatus of claim 20, wherein the convex projecting lens may be moved relative to the light control means to vary the focus of the image at the focal surface.

22. The apparatus of claim 1, wherein the focal surface modulation means has optical properties which are assymmetrical about an axis parallel to the projection path therethrough.

23. The apparatus of claim 22, wherein the focal surface modulation means is formed by a reflective surface having smoothly varying aberrations thereon.

24. The apparatus of claim 22, wherein the focal surface modulation means transmits light and has smoothly varying optical aberrations for creating the focal surface convolutions.

25. The apparatus of claim 24, wherein the smoothly varying optical aberrations are smoothly varying irregularities on the surface of the modulation means.

26. The apparatus of claim 25, wherein the focal surface modulation means is a plate with smoothly varying irregularities on at least one side thereof.

27. The apparatus of claim 1, wherein the focal surface modulation means is positioned on the opposite side of the projection means from the object source.

28. The apparatus of claim 27, wherein the focal surface modulation means includes at least one optical element with irregularities on at least one surface thereof.

29. The apparatus of claim 28, wherein the drive means includes at least one drive for rotating the at least one optical element for causing the convolutions on the focal surface to rotate.

30. The apparatus of claim 1, wherein:
the projection means includes a first and a second generally converging lenses; and
the focal surface modulation means is formed by irregularities on at least one surface of each of the two converging lenses.

31. The apparatus of claim 30, wherein the drive means further includes at least one lens drive for rotating at least one of the two generally converging lenses relative to the other lens for causing variations in the focal surface convolutions.

32. The apparatus of claim 30, wherein the drive means further include a first lens drive for rotating the first lens at an angular velocity and a second lens drive for rotating the second lens at a different angular velocity.

33. The apparatus of claim 32, wherein the angular velocity of the first lens in independently controlled by the first lens drive and the angular velocity of the second lens is independently controlled by the second lens drive.

34. The apparatus of claim 33, wherein the absolute value of one angular velocity is greater than the absolute value of the other angular velocity.

35. The apparatus of claim 33, wherein the first lens drive rotates the first lens in one direction and the second lens drive rotates the second lens in the opposite direction.

36. The apparatus of claim 33, wherein the angular velocity of the first lens is a non integer multiple of the angular velocity of the second lens for maximizing the time period between repetitive convolution patterns.

37. The apparatus of claim 32, wherein at least one of the lens drives includes an eccentrically mounted wheel for rotating the lens associated therewith while simultaneously imparting a translational motion to the lens.

38. Optical system for providing a focus modulated image, comprising:
light projecting means for providing at least one beam of light;
light control means positioned in the beam of light and having at least one aperture means for defining the image to be modulated
a pair of optical elements for sequentially receiving the beam of light, at least one of which is moving and both of which have at least one optically active surface incorporating aberrations for causing focus modulations in the image formed by said beam of light; and
motion means which moves at least of one the optical elements for changing the positional relationship between the aberrations and the beam of light to activate the focus modulations in the image formed by said beam of light.

39. The optical system of claim 38, wherein the aberrations in the optically active surface are smooth forming a single continuous surface.

40. The optical system of claim 39, wherein the optically active surface may be defined by a mathematical expression.

41. The optical system of claim 38, wherein the light projecting means is multicolored for providing light beams of different colors.

42. The optical system of claim 41, further comprising a deflection means for independently deflecting at least a portion of the light beams causing that portion of the light beams to strike the modulation means along independent paths.

* * * * *